(12) United States Patent
Ackerman et al.

(10) Patent No.: US 7,790,652 B2
(45) Date of Patent: Sep. 7, 2010

(54) PROCESS AND CATALYST FOR THE HYDROCONVERSION OF A HEAVY HYDROCARBON FEEDSTOCK

(75) Inventors: Russell Craig Ackerman, Houston, TX (US); Josiane Marie-Rose Ginestra, Richmond, TX (US); Christian Gabriel Michel, Ossining, NY (US)

(73) Assignee: Shell Oil Company, Houston, TX (US)

( * ) Notice: Subject to any disclaimer, the term of this patent is extended or adjusted under 35 U.S.C. 154(b) by 1237 days.

(21) Appl. No.: 10/941,462

(22) Filed: Sep. 15, 2004

(65) Prior Publication Data

US 2005/0101480 A1    May 12, 2005

Related U.S. Application Data

(60) Provisional application No. 60/503,733, filed on Sep. 17, 2003.

(51) Int. Cl.
  B01J 23/24  (2006.01)
  B01J 23/40  (2006.01)
  B01J 23/74  (2006.01)
  C01F 7/02   (2006.01)

(52) U.S. Cl. ............ 502/313; 502/315; 502/316; 423/625; 423/628

(58) Field of Classification Search ........... 502/305, 502/313–316, 319, 325–326, 333–339; 423/625, 423/628
  See application file for complete search history.

(56) References Cited

U.S. PATENT DOCUMENTS

| 4,066,574 A | 1/1978 | Tamm | 252/439 |
| 4,248,852 A | 2/1981 | Wakabayashi et al. | 423/626 |
| 4,549,957 A | 10/1985 | Hensley et al. | 208/216 |
| 5,494,568 A | 2/1996 | Simpson et al. | 208/46 |
| 6,589,908 B1 | 7/2003 | Ginestra et al. | 502/323 |
| 2002/0051878 A1 | 5/2002 | Lussier et al. | 428/325 |
| 2003/0159974 A1 | 8/2003 | Harle et al. | 208/143 |

FOREIGN PATENT DOCUMENTS

WO    00/44856    8/2000

OTHER PUBLICATIONS

International Search Report of Jan. 28, 2005.
Brunauer, Emmet, & Teller, Journal of American Chemical Society, vol. 60 (1938) pp. 309-319.

*Primary Examiner*—Stanley Silverman
*Assistant Examiner*—James Fiorito
(74) *Attorney, Agent, or Firm*—Charles W. Stewart

(57) ABSTRACT

A method of hydroprocessing a heavy hydrocarbon feedstock using a hydroprocessing catalyst having specific properties making it effective in the hydroconversion of at least a portion of the heavy hydrocarbon feedstock to lighter hydrocarbons. The hydroprocessing catalyst comprises a Group VIB metal component (e.g., Cr, Mo, and W), a Group VIII metal component (e.g., Ni and Co) and, optionally, a potassium metal component that are supported on a support material comprising alumina. The alumina has novel physical properties that, in combination with the catalytic components, provide for the hydroprocessing catalyst. The hydroprocessing catalyst is particularly effective in the conversion of the heavy hydrocarbon feedstock. The alumina is characterized as having a high pore volume and a high surface area with a large proportion of the pore volume being present in the pores within a narrow pore diameter distribution about a narrowly defined range of median pore diameters. The support material preferably does not contain more than a small concentration of silica. The alumina component is preferably made by a specific method that provides for an alumina having the specific physical properties required for the hydroprocessing catalyst.

13 Claims, 3 Drawing Sheets

PROCESS AND CATALYST FOR THE HYDROCONVERSION OF A HEAVY HYDROCARBON FEEDSTOCK

This application claims the benefit of U.S. Provisional Application No. 60/503,733, filed Sep. 17, 2003.

BACKGROUND OF THE INVENTION

This invention relates to a process and a catalyst composition used in the process for the hydroprocessing of a heavy hydrocarbon feedstock. Another aspect of the invention includes a catalyst support material that can be used as a component of the hydroprocessing catalyst composition to impart certain physical properties, which make the hydroprocessing catalyst composition particularly useful in the hydroprocessing of a heavy hydrocarbon feedstock.

The catalytic hydrotreatment of hydrocarbon feedstock in order to remove therefrom impurities such as sulfur, nitrogen, and metal compounds is a commonly used process to improve or upgrade such hydrocarbon feedstock. In a typical hydrotreating process, the hydrocarbon feedstock is contacted in the presence of hydrogen with a hydrotreating catalyst under process conditions that suitably provide for a treated hydrocarbon product. The hydrotreating catalysts used in these processes generally are composed of an active phase that can include a component from the Group VIB metals and a component from the Group VIII metals supported on a porous, refractory inorganic oxide material.

The hydrotreatment of heavy hydrocarbon feedstock is particularly difficult; because, such feeds tend to have high concentrations of contaminating sulfur and metal compounds and may require the use of more severe process conditions than those needed to treat lighter hydrocarbon feedstock. Also, the heavy hydrocarbon feedstock can contain a heavy boiling fraction which a portion thereof is to be converted into lighter and more valuable components. As a result of the particular characteristics of a heavy hydrocarbon feedstock, the hydroprocessing of such a feedstock using a hydroprocessing catalyst will tend to cause its catalytic activity to decline at a rapid rate. This rate of decline in catalytic activity can be an indicator of catalyst stability. A catalyst exhibiting a low rate of decline in catalytic activity is thought of as having a high stability, and a catalyst exhibiting a high rate of decline in catalytic activity is thought of as having a low stability. It is desirable for a catalyst to be highly stable.

The use of ebullating bed reactor systems in the hydrotreatment of a heavy hydrocarbon feedstock has been proposed. In these systems, the heavy hydrocarbon feed is introduced in an upflow direction at the bottom of a catalyst bed contained within a reaction zone in a manner so as to lift or expand the catalyst bed to thereby form a fluidized bed of the catalyst. The heavy hydrocarbon passes through the expanded bed of catalyst into a separation zone wherein the product is separated from the catalyst and liquid hydrocarbon. The liquid hydrocarbon passes through a downcomer to a recycle ebullation pump and is recycled and reused in the expansion of the catalyst bed. It is important in the proper operation of the ebullating bed reactor system for the catalyst particles to have a bulk density within a certain range. The bulk density must be high enough to avoid substantial carryover of catalyst particles with the separated product but not so high as to require unreasonably high feed space velocities to provide for bed expansion.

It is also desirable for the hydrotreatment process to provide for the conversion of at least a portion of the heavy hydrocarbon compounds of a heavy hydrocarbon feed to lighter hydrocarbon compounds. There are those who have presented various hydrotreatment and hydroconversion catalyst compositions for use in the hydroprocessing of heavy hydrocarbon oils. For instance, WO 00/44856 (Nippon Ketjen and Akzo Nobel) discloses a hydroprocessing catalyst that comprises 7 to 20% of a Group VIB metal component (Mo, W, Cr), 0.5 to 6% Group VIII metal component (Ni, Co, Fe), and 0.1 to 2% alkali metal component supported on a carrier of at least 3.5% silica and which has a surface area of at least 150 m$^2$/g, a total pore volume of at least 0.55 ml/g, and a pore size distribution such that 30-80% of the pore volume is present in the pores having a diameter of 100-200 Angstroms and at least 5% of the pore volume is present in the pores having a diameter of above 1000 Angstroms. An important feature of this hydroprocessing catalyst is its silica and sodium content.

U.S. Pat. No. 4,549,957 (Amoco Corporation) discloses a process and catalyst for the hydrotreating of feeds containing high concentrations of metals and sulfur. The hydrotreating catalyst comprises a hydrogenation component on a support having specific required physical properties including a BET surface area of 150 to 190 m$^2$/g, a pore volume of 0.9 to 1.3 cc/g in the micropores having radii up to 600 Angstroms, with at least 0.7 cc/g of such micropore volume in micropores with radii ranging from 50 to 600 Angstroms, a macropore volume of 0.15 to 0.5 cc/g in macropores having radii of 600 to 25,000 Angstroms, and a total pore volume of 1.05 to 1.8 cc/g. The micropore distribution of this catalyst is indicated to be important to its demetalization activity, but the precise composition of the support is indicated as being relatively unimportant.

U.S. Pat. No. 4,066,574 (Chevron Research Company) discloses a hydrodesulfurization process that uses a catalyst containing a Group VIB metal and a Group VIII metal on a support material that has at least 70 vol. % of its pore volume in pores having a diameter between 80 and 150 Angstroms and less than 3 vol % of its pore volume in pores having a diameter above 1000 Angstroms. There is no mention of the surface area of the catalyst and the patent states that the support material may include silica suggesting that there is no critical concentration thereof in the support material.

There is a continuing need to develop hydrotreating catalyst compositions that have improved properties over prior art catalysts such as better catalytic activity and stability. There is also an ongoing need to develop improved catalyst compositions and processes that provide for the hydrotreating and hydroconversion of heavy hydrocarbon feedstock.

SUMMARY OF THE INVENTION

It is an object of the invention to provide a new alumina-containing support material that is useful as a component of a hydrotreating and hydroconversion catalyst for the hydroconversion of a heavy hydrocarbon feedstock.

It is another object of the invention to provide a hydrotreating and hydroconversion catalyst that is particularly suitable for use in the hydroconversion of a heavy hydrocarbon feedstock.

Yet, another object of the invention is to provide a process for the hydroconversion of a heavy hydrocarbon feedstock.

Still, another object of the invention is to provide a hydrotreating and hydroconversion catalyst that can suitably be used as the catalyst component of an ebullating bed reactor system.

Accordingly, a support material is provided that can suitably be used as a component of a catalyst composition for use in the hydroconversion of a heavy hydrocarbon feedstock.

The support material comprises alumina. The support material further comprises pores having a medium pore diameter in the range of from about 100 Angstroms to about 140 Angstroms, a pore size distribution width of less than about 33 Angstroms, a pore volume of at least 0.75 cc/gram, wherein less than 5 percent of the pore volume of the support material is present in the pores having a pore diameter of greater than about 210 Angstroms.

In another invention, a catalyst composition is provided that can suitably be used for the hydroconversion of a heavy hydrocarbon feedstock. The catalyst composition comprises a Group VIB metal component, a Group VIII metal component, and a support material. The support material comprises alumina and has a medium pore diameter in the range of from about 100 Angstroms to about 140 Angstroms, a pore size distribution width of less than about 33 Angstroms and pore volume of at least about 0.7 cc/gram.

In yet another invention, provided is a process for the hydroconversion of a heavy hydrocarbon feedstock. The process includes contacting the heavy hydrocarbon feedstock with a hydrotreating and hydroconversion catalyst composition under suitable hydroconversion process conditions. The hydrotreating and hydroconversion catalyst composition comprises a Group VIB metal component a Group VIII metal component and a support material. The support material comprises alumina and has a medium pore diameter in the range of from about 100 Angstroms to about 140 Angstroms, a pore size distribution width of less than about 33 Angstroms and pore volume of at least about 0.7 cc/gram.

In still another invention, provided is a method of making an alumina suitable for an alumina support material. The method comprises the steps of forming a first aqueous slurry of alumina by mixing, in a controlled fashion, a first aqueous alkaline solution and a first aqueous solution of a first aluminum compound so as to thereby provide the first aqueous slurry having a first pH in the range of from about 9 to about 10 while maintaining a first aqueous slurry temperature in the range of from about 25 to 30° C.; thereafter, increasing the first aqueous slurry temperature to the range of from about 50° C. to 90° C. to provide a temperature adjusted first aqueous slurry; forming a second aqueous slurry, comprising alumina, by adding in a controlled fashion to the temperature adjusted first aqueous slurry a second aqueous solution of a second aluminum compound and a second aqueous alkaline solution so as to thereby provide the second aqueous slurry having a second pH in the range of from about 8.5 to 9 while maintaining a second aqueous slurry temperature in the range of from about 50° C. to 90° C.; and recovering at least a portion of the alumina of the second aqueous slurry to thereby provide the alumina.

Other objects and advantages of the invention will become apparent from the following detailed description and appended claims.

DETAILED DESCRIPTION OF THE INVENTION

Figure 1:
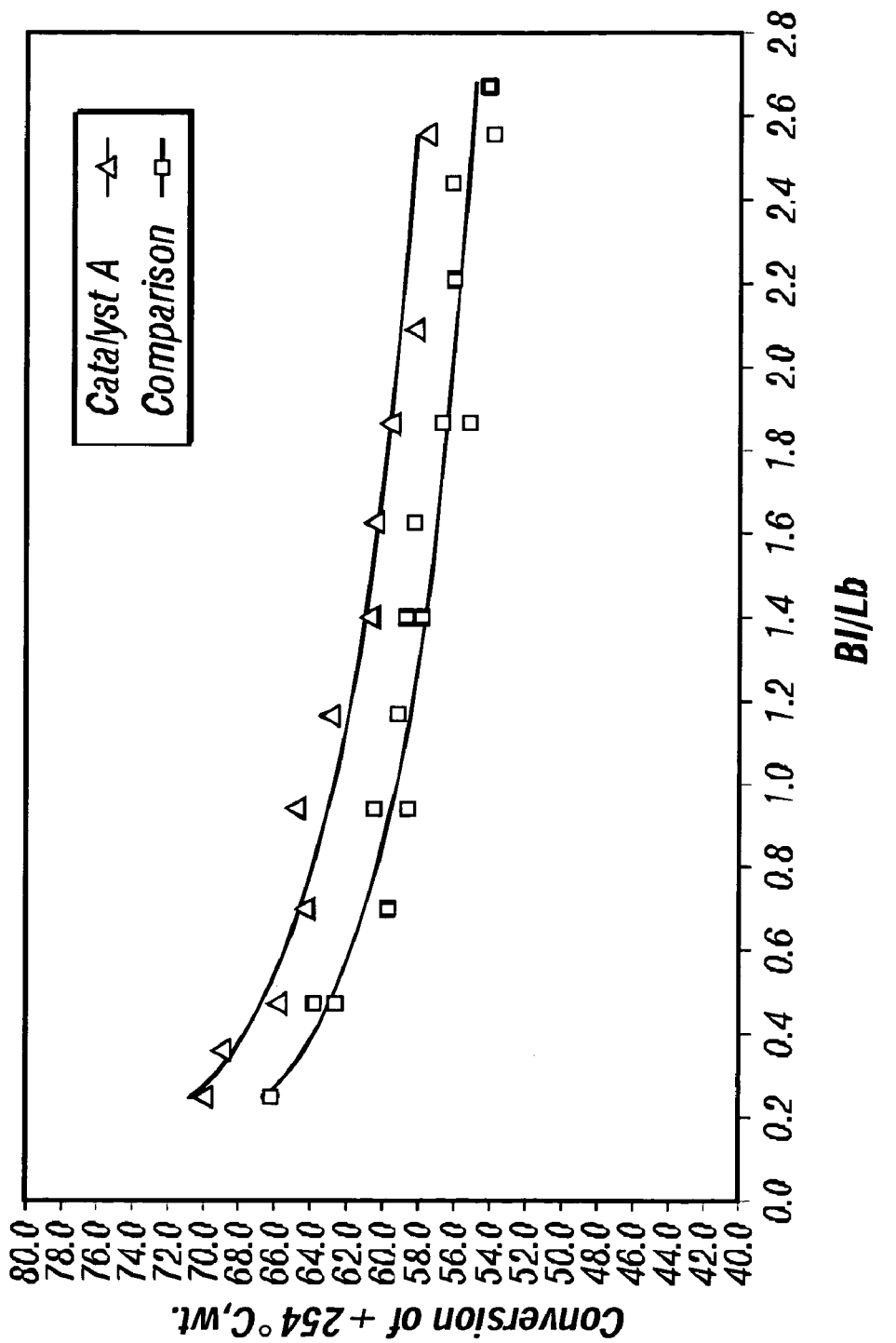
FIG. 1 presents plots of the percent pitch conversion as a function of catalyst age for the hydrotreating and hydroconversion catalyst composition of the invention and a comparative catalyst when used in the hydroconversion of a heavy hydrocarbon feedstock. The plot shows that the hydroconversion catalyst composition provides for a significant improvement in pitch conversion and catalyst stability relative to the comparative catalyst.
Figure 2:
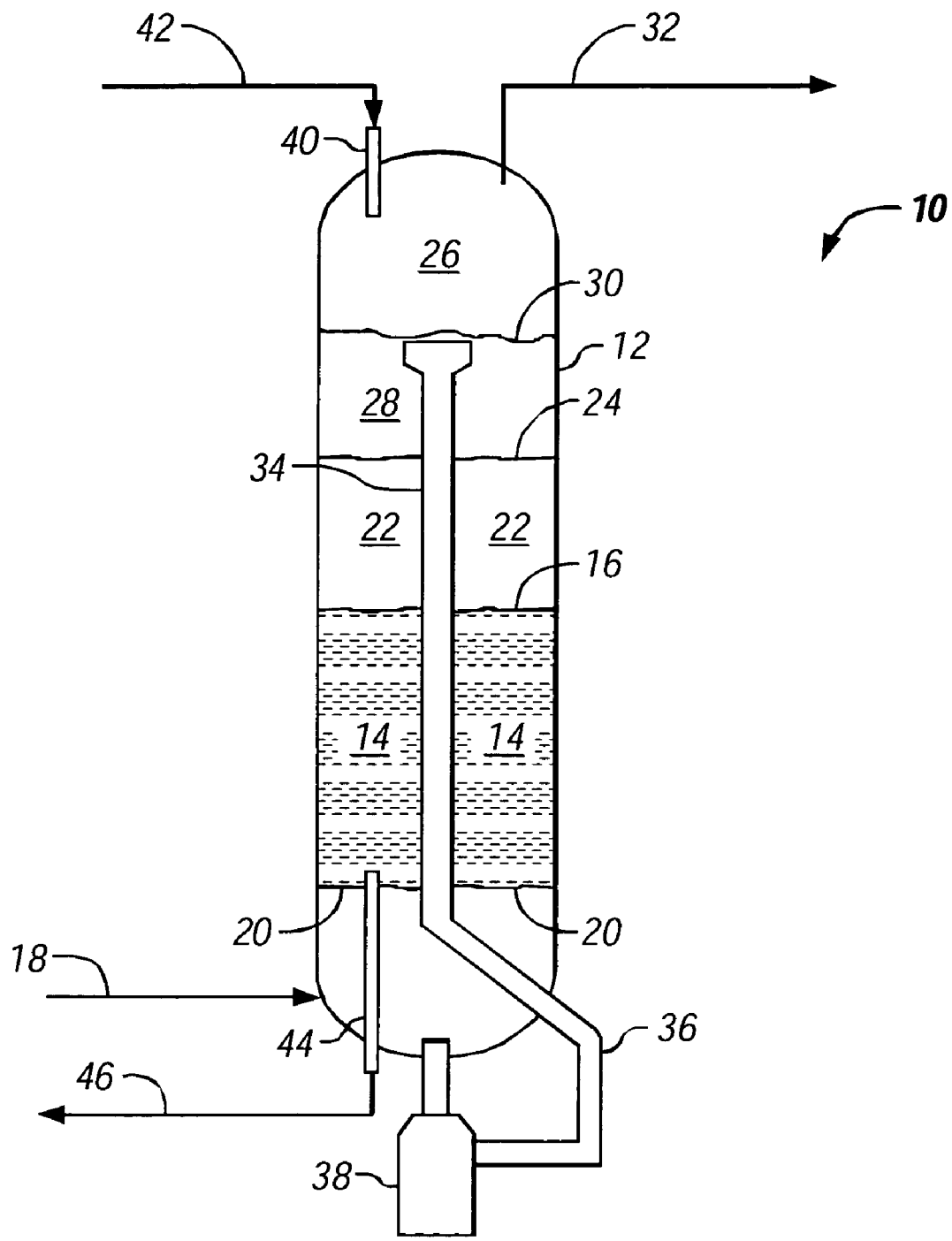
FIG. 2 is a simplified schematic representation of certain aspects of one embodiment of the inventive process for the hydroconversion of a heavy hydrocarbon feedstock that uses the inventive catalyst in an ebullated bed reactor system.

The inventive hydroconversion catalyst includes a novel alumina support material that has specifically defined physical properties. It has been found that this novel alumina support material provides, when used in combination with a hydrotreating component, for certain unexpected catalytic hydroconversion performance properties of the hydroconversion catalyst when it is used in the hydroconversion of a heavy hydrocarbon feedstock.

The alumina support material of the hydroconversion catalyst is characterized as having a large proportion of its pore volume being present in its pores within a narrow range of pore diameters distributed about a narrowly defined range of median pore diameters. The alumina support material further has a high pore volume and a high surface area. It also can be a desirable feature of the alumina support material to not contain more than a small concentration of silica such as to affect the catalytic performance of the hydroconversion catalyst of which the alumina support material is a component.

The references herein to the surface area of the alumina support material are surface areas as measured by nitrogen adsorption, using the well-known B.E.T. method. The B.E.T. method of measuring surface area has been described in detail by Brunauer, Emmet and Teller in *J. Am. Chem. Soc.* 60 (1938) 309-316, which is incorporated herein by reference.

The references herein to the pore size distribution and pore volume of the alumina support material are to those properties as determined by mercury penetration porosimetry. The measurement of the pore size distribution of the alumina support material is by any suitable mercury porosimeter capable of working in the pressure range between atmospheric pressure and about 60,000 PSI, using a contact angle of 1400 with a mercury surface tension of 474 dyne/cm at 25° C. Pore volume is defined as the total volume using the mercury intrusion method as measured between atmospheric pressure and a pressure of about 60,000 psia. The references herein to median pore diameter (MPD) correspond to the median pore diameter by volume.

The pore structure of the alumina support material is such that the pore size distribution width is less than about 33 Angstroms. As the term is used herein "pore size distribution width" means the smallest range of pore diameters of the pores of the alumina support material in which is present two-thirds of the total pore volume of the alumina support material. In order to provide for the best catalyst performance, however, it is better for the pore size distribution width to be within an even more narrow range of less than 25 Angstroms, and, preferably, less than 22 Angstroms. It is most preferred for the pore size distribution width of the alumina support material to be less than 20 Å.

It is also recognized that, in order to provide for the catalytic performance properties as noted herein, it is important for the median pore diameter of the pores of the alumina support material to be within the narrow range of suitable pore diameters of from about 100 Å to about 140 Å. This specific median pore diameter is a particularly important attribute of the alumina support material component of the hydroconversion catalyst when the hydroconversion catalyst is used in the hydroconversion of a heavy hydrocarbon feedstock, and, in such an instance, the median pore diameter of the pores of the alumina support material can be within the range of pore diameters of from 110 Å to 126 Å. Preferably, the median pore diameter of the pores of the alumina support material is within the range of pore diameters of from 112 Å to 122 Å, and, most preferably, from 114 Å to 120 Å.

The narrow pore distribution of the alumina support material is further reflected by the absence of pore volume being present in the larger pores so that less than about 5 percent of the total pore volume of the alumina support material is present in the pores having pore diameters greater than 210 Å. But, a more important aspect is that it is not desirable for the alumina support material to include macropores having pore diameters exceeding 210 Å; since, such pores do not provide for the desired catalytic benefits required for the hydroconversion of a heavy hydrocarbon feedstock. Thus, in order to maximize the proportion of the alumina support material that provides the desired catalytic benefits, it is best to minimize the amount of pore volume contained in the pores having pore diameters exceeding 210 Å. It is, therefore, desirable that less than 3 percent of the total pore volume of the alumina support material to be present in the pores having pore diameters greater than 210 Å. It is preferred for less than 1.5 percent of the total pore volume of the alumina support material to be in pores of pore diameter greater than 210 Å, and, most preferred, less than 1 percent.

Other physical attributes of the inventive alumina support material are that it has both a high surface area and a high pore volume. These attributes, in combination with the narrow pore size distribution and narrowly defined median pore diameter, uniquely provide for the inventive hydroconversion catalyst having better catalytic properties for the hydroconversion of a heavy hydrocarbon feedstock than alternative catalysts. The surface area of the alumina support material, thus, exceeds about 200 m²/g, but, preferably, it exceeds 210 m²/g, and, most preferably, the surface area exceeds 225 m²/g.

The total pore volume of the alumina support material is also relatively high and can be related to the pore size distribution width by the following equation:

$$PV \geq 0.7 + 0.004 \times (w)$$

wherein PV is the total pore volume of the alumina support material in cc/gram; w is the pore size distribution width in Angstroms; and the symbol ≧ means greater than or equal to. The preferred relationship between the total pore volume (PV) of the alumina support material and the pore size distribution width (w) is as follows: $PV \geq 0.73 + 0.004 \times (w)$. Thus, in an example of the application of the above equation, if the pore size distribution width of the alumina support material is less than 33 Angstroms, the total pore volume of the alumina support material can be at least 0.832 cc/gram and, preferably, at least 0.862 cc/gram, or if the pore size distribution width is less than 25 Angstroms, the total pore volume can be at least 0.8 cc/gram, and preferably at least 0.83 cc/gram, or if the pore size distribution width is less than 22 Angstroms, the total pore volume can be at least 0.788 cc/gram and, preferably, at least 0.818 cc/gram, or if the pore size distribution width is less than 20 Angstroms, the total pore volume can be at least 0.78 cc/gram and preferably at least 0.81 cc/gram. Therefore, the total pore volume of the novel alumina support material will generally be at least 0.78 cc/gram or at least 0.79 cc/gram, and, preferably, at least 0.81 cc/gram. Most preferably, the total pore volume exceeds 0.83 cc/gram.

The hydroconversion catalyst of the invention comprises, consists essentially of, or consists of a metal component and the alumina support material. The metal component can include at least one component from a Group VIB metal component or at least one component from a Group VIII metal component, or both metal components. It is preferred for the hydroconversion catalyst to comprise both a Group VIB metal component and a Group VIII metal component. In a further preferred embodiment, the hydroconversion catalyst can further comprise a phosphorous component.

The Group VIII metal component of the hydroconversion catalyst composition are those Group VIII metal or metal compounds that, in combination with the other components of the catalyst composition, suitably provide a hydroconversion catalyst having the desired properties as described herein. The Group VIII metal can be selected from the group consisting of iron, nickel, cobalt, palladium and platinum. Preferably, the Group VIII metal is either nickel or cobalt and, most preferably, the Group VIII metal is nickel. The Group VIII metal component contained in the hydroconversion catalyst composition can be in the elemental form or in the form of a metal compound, such as, for example, oxides, sulfides and the like, or mixtures thereof. The amount of Group VIII metal in the hydroconversion catalyst composition can be in the range of from or about 0.5 to or about 6 weight percent, or about 0.5 to about 5 weight percent, elemental metal based on the total weight of the hydroconversion catalyst composition. Preferably, for pitch conversion, the concentration of Group VIII metal in the hydroconversion catalyst composition is in the range of from 1.5 weight % to 3 weight %, and, most preferably, the concentration is in the range of from 2 weight % to 2.5 weight %.

The Group VIB metal component of the hydroconversion catalyst composition are those Group VIB metal or metal compounds that in combination with the other elements of the hydroconversion catalyst composition, provide a hydroconversion catalyst having the desired properties as described herein. The Group VIB metal can be selected from the group consisting of chromium, molybdenum and tungsten. The preferred Group VIB metal is either molybdenum or chromium and, most preferred, it is molybdenum. The Group VIB metal component contained in the hydroconversion catalyst composition can be in the elemental form or in the form of a metal compound, such as, for example, oxides, sulfides and the like. The amount of Group VIB metal in the hydroconversion catalyst composition can be in the range of from or about 4 to or about 22 weight percent, or about 4 to about 20 weight percent, elemental metal based on the total weight of the hydroconversion catalyst composition. Preferably, for pitch conversion, the concentration of Group VIII metal in the hydroconversion catalyst composition is in the range of from 6 weight % to 12 weight %, and, most preferably, the concentration is in the range of from 8 weight % to 10 weight %.

In a preferred embodiment, the hydroconversion catalyst composition further includes a phosphorous compound. The concentration of phosphorous in the hydroconversion catalyst composition can be in the range of from or about 0.05 to or about 6 weight percent, or about 0.05 weight percent to about 5 weight percent, elemental phosphorus based on the total weight of the hydroconversion catalyst composition. But, preferably, the concentration of phosphorous is in the range of from 0.1 weight % to about 2 weight %, and, most preferably, from 0.2 to 1.5 weight %.

In order to provide a hydroconversion catalyst composition having the desired improved catalytic properties, it is important for the alumina support material to substantially comprise alumina preferably made by the methods as described herein. It is recognized that the alumina support material should also contain no more than a small amount of silica due to the negative impact it can have on the catalytic properties of the final hydroconversion catalyst composition, and, thus, the alumina support material generally should include less than 3 weight percent silica, preferably, less than 2 weight percent silica, and, most preferably, less than 1 weight percent silica.

While the alumina support material can contain small amounts of other components that do not materially affect the properties of the hydroconversion catalyst, the alumina support material should generally comprise at least 90 weight percent of the alumina as herein described, and, preferably, at least 95 weight percent, and, most preferably, greater than 99 weight percent alumina. The alumina support material, thus, can consist essentially of alumina. The phrase "consist essentially of" as used herein and in the claims with regard to the composition of the alumina support material means that the alumina support material must contain the alumina and it may contain other components; provided, such other components do not materially influence the catalytic properties of the final hydroconversion catalyst composition.

The alumina precursor used in forming the alumina support material of the hydroconversion catalyst composition can be from any source or made by any means or method; provided, however, that the alumina provides for the specific physical properties and pore structure of the alumina support material as fully described herein. One possible method for making an alumina for use in the alumina support material is described in U.S. Pat. No. 4,248,852, which is incorporated herein by reference. This method, however, has certain drawbacks in that the required sequential and alternate addition of an aluminum compound followed by the addition of a neutralizing agent to a hydrogel of seed aluminum hydroxide may not necessarily provide for an alumina precursor that has or can be converted to have the novel physical properties as described herein for the inventive alumina support material. It is, thus, preferred for the alumina precursor to be made by a two-step precipitation process for making an alumina precursor as broadly described in U.S. Pat. No. 6,589,908, which is incorporated herein by reference.

An even more preferred method for preparing the alumina precursor of the inventive alumina support material is a two-step precipitation process used to form an alumina precursor that has or can be converted to have the novel physical properties necessary for the inventive alumina support material.

The first step of the two-step precipitation process includes forming a first aqueous slurry of alumina by admixing, in a controlled fashion within a first precipitation zone, a first aqueous alkaline solution of at least one alkaline compound selected from the group consisting of sodium aluminate, potassium aluminate, ammonia, sodium hydroxide, and potassium hydroxide with a first aqueous acidic solution of at least one acidic compound selected from the group consisting of aluminum sulfate, aluminum chloride, aluminum nitrate, sulfuric acid, hydrochloric acid, and nitric acid. The mixing of the first aqueous alkaline solution and the first aqueous acidic solution requires that either the alkaline compound of the first aqueous alkaline solution or the acidic compound of the first aqueous acidic solution, or both the alkaline compound and the acidic compound of such solutions, be a compound containing aluminum. For example, the alkaline compound of the first aqueous alkaline solution that is an aluminum containing compound is either sodium aluminate or potassium aluminate, and the acidic compound of the first aqueous acidic solution that is an aluminum containing compound is either aluminum sulfate or aluminum chloride or aluminum nitrate.

The first aqueous alkaline solution and the first aqueous acidic solution are mixed together, in a well mixed tank and in a controlled manner, in such proportions as to thereby maintain a first pH of the resulting first aqueous slurry in the range of from about 8 to about 11. The first aqueous alkaline solution and the first aqueous acidic solution are also admixed together in such quantities as to thereby provide the first aqueous slurry that contains a first desired amount of alumina that is in the range of from about 25 weight % to about 35 weight % of the total alumina made by the two-step precipitation process. The temperature within the first precipitation zone and at which the mixing step is conducted is maintained or controlled at a first aqueous slurry temperature in the range of from about 20° C. to about 40° C., preferably, from 25 to 30° C.

When the first desired amount of alumina has been formed in the first step, the temperature of the resulting first aqueous slurry is thereafter increased from the first aqueous slurry temperature to a temperature adjusted first aqueous slurry temperature that is in the range of from about 45° C. to about 70° C., preferably, from 50 to 65° C. This raising of the temperature of the first aqueous slurry can be done by heating the first aqueous slurry either while it is contained within the first precipitation zone or as it is transferred into a second precipitation zone or after it has been transferred into and while it is contained within the second precipitation zone.

The second step of the two-step precipitation process can be conducted either in the first precipitation zone or in a second precipitation zone. It is preferred to transfer the first aqueous slurry, which has been heated to the temperature adjusted first aqueous slurry temperature, to the second precipitation zone wherein the second step of the two-step precipitation process is conducted.

A second aqueous slurry is thus formed by admixing in a controlled fashion, and, preferably, within a second precipitation zone with the temperature adjusted first aqueous slurry, a second aqueous alkaline solution of at least one alkaline compound selected from the group consisting of sodium aluminate, potassium aluminate, ammonia, sodium hydroxide, and potassium hydroxide and a second aqueous acidic solution of at least one compound selected from the group consisting of aluminum sulfate, aluminum chloride, aluminum nitrate, sulfuric acid, hydrochloric acid, and nitric acid. The mixing of the second aqueous alkaline solution and the second aqueous acidic solution requires that either the alkaline compound of the second aqueous alkaline solution or the acidic compound of the second aqueous acidic solution, or both the alkaline compound and the acidic compound of such solutions, be a compound containing aluminum. For example, the alkaline compound of the second aqueous alkaline solution that is an aluminum containing compound is either sodium aluminate or potassium aluminate, and the acidic compound of the second aqueous acidic solution that is an aluminum containing compound is either aluminum sulfate or aluminum chloride or aluminum nitrate.

The second aqueous alkaline solution and the second aqueous acidic solution are admixed with the first aqueous slurry in the second step of the two-step precipitation process in such amounts and proportions as to thereby provide the second aqueous slurry having a second pH in the range of from about 8 to 10.5. Also, the second aqueous alkaline solution and the second aqueous acidic solution are admixed with the first aqueous slurry in such quantities as to form the remaining amount of alumina made by the two-step precipitation process. The temperature at which the adding step is conducted is maintained or controlled so that a second aqueous slurry temperature is in the range of from about 45° C. to about 70° C., preferably, from 50 to 65° C. The alumina concentration in the final second aqueous slurry should be such that from about 4 weight percent to about 8 weight percent of the total weight thereof is alumina (on an $Al_2O_3$ basis), based on the alumina precipitate being calcined. Preferably, the final second aqueous slurry contains from 6 weight percent to 6.5 weight percent alumina (on calcined basis).

The prepared alumina precursor formed in the two-step precipitation process has special physical properties which permit its use as a component of the alumina support material, as described herein, and the prepared alumina precursor comprises alumina in the form of pseudo-boehmite. More particularly, the prepared alumina precursor made by the two-step precipitation process comprises substantially entirely pseudo-boehmite wherein the alumina comprises at least 90 weight percent thereof pseudo-boehmite, but, preferably, the form of the alumina of the prepared alumina precursor comprises at least 95 weight percent pseudo-boehmite and, more preferably, at least 98 weight percent pseudo-boehmite. Furthermore, the prepared alumina can comprise less than 3 weight percent silica, preferably, less than 2 weight percent silica, and most preferably, less than 1 weight percent silica.

The prepared alumina precursor that is particularly suitable for use as a component in the manufacture of the alumina support material has a high meso pore volume. The mesopore volume of the prepared alumina precursor powder when it is dried and calcined at 1100 F for an hour is greater than 0.89 cc/g, preferably greater than 0.90 cc/g, most preferably greater than 0.92 cc/g. The mesopore volume is the pore volume in the pores having diameters less than 210 Å as measured by mercury porosimetry. The prepared alumina precursor can yield an alumina support material which exhibits a single-modal pore volume distribution characteristic in that no more than one maximum can be observed when the incremental pore volume of the prepared alumina is plotted as a function of pore diameter of the prepared alumina. The surface area of the prepared alumina precursor can exceed 200 $m^2/g$.

The preferred alkaline compound for use in forming both the first aqueous alkaline solution and the second aqueous alkaline solution is sodium aluminate. Generally, the concentration of the sodium aluminate solution is in the range of about 25 to about 45 weight percent sodium aluminate.

The preferred acidic compound for use in forming both the first aqueous acidic solution and the second aqueous acidic solution is aluminum sulfate. It is preferred for the aluminum sulfate concentration to approach saturation in the water. The alumina contained in the second aqueous slurry is recovered therefrom by any suitable method or means known to those skilled in the art. Suitably, the final alumina of the second aqueous slurry is filtered and washed with any suitable solvent, for example, water, in accordance with methods known to those skilled in the art in order to remove from the filter cake water soluble contaminants such a sodium, sulfate, chloride, and the like. The washed filter cake can be used directly in the preparation of the alumina support material or it can be dried to produce a powder of alumina that is used in the preparation of the alumina support material. The filter cake can be dried by any suitable method or means known to those skilled in the art, such as, for example, tray drying, belt drying, flash drying or spray drying. A preferred method that can be used to provide a suitable alumina for use in forming the alumina support material is to spray dry or flash dry a slurry of the alumina obtained from the second aqueous slurry, after proper washing.

The manufacturing method and conditions by which the alumina support material is made are important to providing the alumina support material having the physical properties as described herein and which are necessary to provide the hydroconversion catalyst that has the improved catalytic properties as described herein. One feature of the invention can include the combined use of the alumina precursor made by the two-step precipitation process along with the method of manufacturing the alumina support material using the alumina precursor to provide an alumina support material having the precise physical properties as described herein which make it especially suitable for use in the hydroconversion catalyst of the invention.

In a preferred method to prepare the alumina support material, the prepared alumina is mixed or mulled, with water and a dilute acid to form a paste that can be formed into agglomerate particles such as extrudates. Any suitable method or means known to those skilled in the art can be used to form the agglomerate particles, but known extrusion methods are preferred. The extrudate of the alumina support material is formed by extruding the paste through an extrusion die having openings of desired size and shape. The extrudates can be cylindrical in shape and have a diameter in the range of from about 0.5 mm to about 3.0 mm.

It can be important in the preparation of the particles of alumina support material for the pH of the paste formed by mixing the water, dilute acid, and alumina to be controlled within a certain range. This is in order to provide a final alumina support material for use in the hydroconversion catalyst having the novel physical properties as described herein. The pore size distribution of the final alumina support material is in part controlled by the pH, with a lower pH providing for a sharper pore size distribution as required for the invention. Thus, the pH of the paste of alumina should be in the range of from about 5 to about 9, but, preferably, the pH can be in the range of from 6 to 8.

The formed particle of alumina support material, after drying by any suitable means or method known to those skilled in the art, is heat treated, or calcined, to provide the final alumina support material. The dried, formed particle of alumina support material is preferably calcined in the presence of oxygen or an oxygen containing inert gas or air. While the proper calcination time and calcination temperature can depend on the particular equipment used in the calcination, the production rate of catalyst particles and the desired median pore size, the temperature at which the dried, formed particle of alumina support material is calcined generally is in the range of from 371° C. (700° F.) to about 760° C. (1400° F.). Preferably, the calcination temperature is in the range of from 482° C. (900° F.) to 732° C. (1350° F.), and, more preferably, it is from 399° C. (950° F.) to 704° C. (1300° F.). The time required for the calcination is generally in the range of from about 0.5 hours to about 4 hours.

The calcination provides, among other things, the conversion of the pseudo-bohemite alumina into predominantly gamma alumina. Thus, the alumina of the alumina support material will comprise gamma alumina in a predominant amount wherein the alumina component of the alumina support material can comprise at least 90 weight percent gamma alumina. Preferably, the alumina comprises at least 95 weight percent gamma alumina and, most preferably, at least 98 weight percent. Any suitable equipment such as a direct fire kiln, an indirect fire rotary calciner or a moving belt calcination system can be used to calcine the dried, formed particle of alumina support material.

The metal components of the hydroconversion catalyst are incorporated into the alumina support material by any suitable means or method known to those skilled in the art. For instance, the metal and phosphorous components can be co-mulled with the alumina of the alumina support material during the formation of the agglomerate particles of the alumina support material, or the metal and phosphorous components can be incorporated into the alumina support material by impregnation, or the metal and phosphorous can be incorporated into the alumina support material by a combination of methods. It is preferred, however, to use an impregnation procedure to impregnate the alumina support material with one or more of the catalytic components as described herein.

Suitable impregnation procedures include, for example, spray impregnation, soaking, multi-dip procedures, and incipient wetness impregnation methods. An impregnation solution comprising either a Group VIII metal compound, or a Group VIB metal compound, or a phosphorous compound, or any combination of such compounds, dissolved in a suitable liquid solvent such as water, alcohol, or liquid hydrocarbon is used to impregnate the alumina support material with the catalytic components. The catalytic components are incorporated into the alumina support material in such amounts as to provide the concentration of metal components as described above. The alumina support material with the incorporated hydrogenation components can be dried, or calcined, or both, in accordance with known methods to provide the hydroconversion catalyst.

The novel hydroconversion catalysts described herein can be used advantageously for the hydrotreating and hydroconversion of a heavy hydrocarbon feedstock; and, in fact, the hydroconversion catalysts provide for superior results in the hydroconversion of the pitch fraction of a heavy hydrocarbon feedstock.

The hydroconversion catalyst when in the form of a shaped particle such as a sphere or a pill or an extrudate, but, preferably, an extrudate, can be a particularly superior and beneficial catalyst when used in an ebullated bed reactor system for the hydroprocessing a heavy hydrocarbon feedstock. The shaped or formed particle of the hydroconversion catalyst composition can, thus, have density properties such that they provide a bulk density that makes the shaped or formed particle of the hydroconversion catalyst composition effective for the use in an ebullated reactor bed for the hydroconversion of a heavy hydrocarbon feedstock.

The bulk density of the shaped or formed particle of the hydroconversion catalyst can be within a broad range that permits its use in a wide array of catalytic processes such as fixed bed, fluidized bed and ebullated bed processes. The bulk density of the shaped or formed particles of the hydroconversion catalyst makes them particularly suitable for use in an ebullated reactor bed system.

The heavy hydrocarbon feedstock of the inventive process can be obtained from any suitable source of hydrocarbons, including, for example, petroleum crude oils and tar sand hydrocarbons, such as, the heavy oils extracted from tar sand. The heavy hydrocarbon feedstock can be a vacuum resid or atmospheric resid component of a petroleum crude oil or a tar sand hydrocarbon.

The heavy hydrocarbon feedstock can further include high concentrations of sulfur and nitrogen compounds and metals, such as, nickel and vanadium. Indeed, it is the high concentrations of metal, sulfur and nitrogen compounds in addition to the high molecular weight of the heavy hydrocarbon feedstock that make its hydrotreatment so challenging.

The heavy hydrocarbon feedstock, thus, includes a mixture of hydrocarbons derived from a crude oil or tar sand hydrocarbon material or other source of heavy hydrocarbons. A portion, preferably a major portion, of the heavy hydrocarbons of the mixture has a boiling temperature exceeding about 343° C. (650° F.). The heavy hydrocarbon feedstock is thus defined as having a boiling range, as determined by ASTM test procedure D-1160, such that at least about 30 weight percent of the heavy hydrocarbon feedstock boils at a temperature exceeding 524° C. (975° F.). The preferred heavy hydrocarbon feedstock has a boiling range such that at least 40 weight percent boils at a temperature exceeding 524° C. (975° F.), and, most preferably, at least 50 weight percent of the heavy hydrocarbon feedstock boils at a temperature exceeding 524° C. (975° F.).

The API gravity of the heavy hydrocarbon feedstock can range from about 3 to about 20, but, more specifically, the API gravity is in the range of from 4 to 15, and, more specifically, from 4 to 11.

The heavy hydrocarbon feedstock can have a Conradson carbon content, as determined by ASTM testing method D-189, exceeding 5 weight percent and, more specifically, the Conradson carbon content is in the range of from 8 weight percent to 30 weight percent.

The heavy hydrocarbon feedstock can also comprise sulfur compounds in amounts such that the concentration of sulfur in the heavy hydrocarbon feedstock exceeds about 2 weight percent and even exceeds 3 weight percent. More specifically, the sulfur concentration in the heavy hydrocarbon feedstock can be in the range of from 4 to 10 weight percent. The heavy hydrocarbon feedstock can further comprise nitrogen compounds in amounts such that the concentration of nitrogen in the heavy hydrocarbon feedstock exceeds 0.1 weight percent and even exceeds 0.2 weight percent. More specifically, the nitrogen concentration in the heavy hydrocarbon feedstock can be in the range of from 0.3 to 3 weight percent.

As earlier noted, the metals contained in the heavy hydrocarbon feedstock can include nickel or vanadium, or both. The nickel concentration in the heavy hydrocarbon feedstock can exceed 10 parts per million by weight (ppmw) or it can exceed 30 ppmw. More specifically, the nickel concentration in the heavy hydrocarbon feedstock can be in the range of from 40 ppmw to 500 ppmw. The vanadium concentration in the heavy hydrocarbon feedstock can exceed 50 ppmw or it can exceed 100 ppmw. More specifically, the vanadium concentration in the heavy hydrocarbon feedstock can be in the range of from 150 ppmw to 1500 ppmw.

The process of the invention includes contacting the heavy hydrocarbon feedstock, preferably in the presence of hydrogen, with the hydroconversion catalyst under suitable hydroprocessing conditions. One important aspect of the inventive process is that it provides for an exceptionally high percentage conversion of the pitch component of the heavy hydrocarbon feedstock, especially when compared to the conversions provided by certain other catalysts and processes.

As used herein, the term "pitch" refers to the hydrocarbon molecules contained in the fraction of the heavy hydrocarbon feedstock that boil at temperatures above 524° C. (975° F.). The references herein to "pitch conversion" or similar references to the conversion of pitch, are speaking of the cracking of the heavy hydrocarbon molecules that make up the pitch component of the heavy hydrocarbon feedstock to smaller hydrocarbon molecules that boil at temperatures below 524° C. (975° F.).

The percent conversion of pitch is then defined as being the weight percent of the pitch contained in the heavy hydrocarbon feedstock that is converted by the hydroconversion process, and it can be represented by the ratio of the difference between the weight of pitch in a feed and the weight of pitch in the product with the difference divided by the weight of pitch in the feed with the resulting ratio being multiplied by 100 to provide the percentage pitch conversion.

The hydroconversion process can be carried out by the use of any suitable reaction means or system including fixed bed, moving bed, fluidized bed and ebullated bed reactor systems. While the hydroconversion catalyst can be used as a part of any suitable reactor system, its properties make it particularly suitable for use in ebullated bed systems. For instance, the hydroconversion catalyst can be formed into particles that provide for a bulk density which make the hydroconversion catalyst especially effective for use as the catalyst component of an ebullated bed system.

The hydroprocessing conditions under which the heavy hydrocarbon feedstock is contacted with the hydroconversion catalyst include those process conditions that are effective in providing for a hydrotreated product and, preferably, that are effective in the conversion of at least a portion of the pitch component of the heavy hydrocarbon feedstock. The conversion of the pitch component can exceed about 50 weight percent of the pitch. Higher pitch conversion is desirable and, thus, preferably, pitch conversion exceeds 55 weight percent and, most preferably, pitch conversion exceeds 60 weight percent.

The inventive hydroconversion catalyst can suitably provide a high pitch conversion, since the activity of the fresh hydroconversion catalyst for the conversion of pitch of a heavy hydrocarbon feedstock can exceed about 58 weight percent and even exceed about 60 weight percent. The preferred hydroconversion catalyst can even have a pitch conversion activity in its fresh state exceeding 62 weight percent and, most preferred, exceeding 64 weight percent. The weight percent conversion of pitch is defined as the conversion as measured using the testing procedure as described in Example 5 herein.

Suitable hydroprocessing conditions under which the heavy hydrocarbon feedstock is contacted with the hydroconversion catalyst can include a hydroconversion contacting temperature in the range of from about 316° C. (600° F.) to about 538° C. (1000° F.), a hydroconversion total contacting pressure in the range of from about 500 psia to about 6,000 psia, which includes a hydrogen partial pressure in the range of from about 500 psia to about 3,000 psia, a hydrogen addition rate per volume of heavy hydrocarbon feedstock in the range of from about 500 SCFB to about 10,000 SCFB, and a hydroconversion liquid hourly space velocity (LHSV) in the range of from about 0.2 $hr^{-1}$ to 5 $hr^{-1}$.

The preferred hydroconversion contacting temperature is in the range of from 316° C. (600° F.) to 510° C. (950° F.), and, most preferred, from 371° C. (700° F.) to 455° C. (850° F.). The preferred hydroconversion total contacting pressure is in the range of from 500 psia to 2,500 psia, most preferably, from 500 psia to 2,000 psia, with a preferred hydrogen partial pressure of from 800 psia to 2,000 psia, and most preferred, from 1,000 psia to 1,800 psia. The LHSV is preferably in the range of from 0.2 hr-1 to 4 hr-1, and, most preferably, from 0.2 to 3 hr-1. The hydrogen addition rate is preferably in the range of from 600 SCFB to 8,000 SCFB, and, more preferably, from 700 SCFB to 6,000 SCFB.

Presented in FIG. 6 is a simplified schematic representation of an ebullated bed reactor system 10. The ebullated bed reactor system includes elongated vessel 12 that defines several zones such as a contacting zone for contacting a heavy hydrocarbon feedstock under suitable hydroconversion reaction conditions with a hydroconversion catalyst and a separation zone for the separation of a hydrotreated heavy hydrocarbon product from the hydroconversion catalyst.

Within elongated vessel 12 is a settled hydroconversion catalyst bed 14 having a settled hydroconversion catalyst bed level 16. A reactor feed comprising heavy hydrocarbon feedstock and hydrogen is introduced into elongated vessel 12 by way of conduit 18. The reactor feed passes through horizontal distributor plate 20 that provides means for directing the reactor feed upwardly and through settled hydroconversion catalyst bed 14. The passing of the reactor feed through settled hydroconversion catalyst bed 14 serves to lift and to expand the hydroconversion catalyst to thereby provide an expanded hydroconversion catalyst bed 22 (ebullated catalyst bed) having an expanded hydroconversion catalyst bed level 24.

In separation zone 26 of elongated vessel 12, hydroconversion catalyst is separated from liquid hydrocarbon 28, having a liquid level 30, and the product from the hydrotreatment of the heavy hydrocarbon feedstock, which passes from elongated vessel 12 by way of conduit 32.

Downcomer 34 within elongated vessel 12 provides conduit means for recycling the liquid hydrocarbon 28 to the bottom of expanded hydroconversion catalyst bed 22. Conduit 36 is operatively connected in fluid flow communication between downcomer 34 and ebullating pump 38. Ebullating pump 38 provides means for recycling and circulating the liquid hydrocarbon 28 through expanded hydroconversion catalyst bed 22.

The upper end of elongated vessel 12 includes catalyst inlet conduit means 40, which provides for the introduction of fresh hydroconversion catalyst while ebullated bed reactor system 10 is in operation. Fresh hydroconversion catalyst can be introduced into elongated vessel 12 through conduit means 40 by way of conduit 42. The lower end of elongated vessel 12 includes catalyst outlet conduit means 44, which provides for the removal of spent hydroconversion catalyst while ebullated bed reactor system 10 is in operation.

The hydroconversion catalyst of the invention is particularly suitable for use in an ebullated bed reactor system which in certain instances can provide advantages over other types of reactor systems, for example, fixed bed reactor systems. Ebullated bed reactor systems are especially suitable for the hydroconversion of heavy hydrocarbon feedstocks; because, they enable an operation at the higher process temperatures and pressures generally required for the hydroprocessing of heavy feedstocks, and they permit the addition and withdrawal of the hydroconversion catalyst without requiring reactor shutdown.

The following Examples are presented to illustrate the invention, but they should not be construed as limiting the scope of the invention.

Example 1

This Example 1 describes, generally, the laboratory preparation of the aluminum powder used to make the catalyst substrates that were used as the alumina support material in the preparation of the hydroconversion catalyst of the invention. This Example also presents the specific preparation conditions under which the alumina powders A, B, C, D and E were prepared using the generally described preparation procedure.

The alumina used for the catalyst substrate was made by a two-step precipitation process. The first step includes forming a first aqueous slurry of alumina by mixing a first aqueous alkaline solution of sodium aluminate with a first aqueous acidic solution of aluminum sulfate. The first aqueous alkaline solution and the first aqueous acidic solution were mixed in such amounts as to provide the first aqueous slurry that has a first pH and which contained a first amount of alumina (precipitate) as a percent of the total alumina made by the two-step precipitation process. The first step was conducted at a first precipitation temperature.

When the desired first amount of alumina was formed in the first step, the temperature of the resulting first aqueous slurry was thereafter increased to a second precipitation temperature. A second aqueous slurry was thereafter formed by adding, in a controlled fashion, to the first aqueous slurry both a second aqueous acidic solution aluminum sulfate and a second aqueous alkaline solution of sodium aluminate so as to thereby provide the second aqueous slurry having a second pH and to form the remaining amount of alumina made by the two-step precipitation process. The second step was conducted at the second precipitation temperature. The alumina contained in the second aqueous slurry was recovered, washed, dried and used in the preparation of the extrudates of Example 2.

Table 1 presents the preparation conditions under which each of the alumina powders A through E were made.

TABLE 1

Conditions Used in the Two-Step Preparation of Alumina Powders A, B, C, D and E
Alumina Powder Preparation

| Alumina Powder Sample | 1st Step Conditions | | | 2nd Step Conditions | | Final $Al_2O_3$ concentration (%) |
|---|---|---|---|---|---|---|
| | First pH | First Temp (° C.) | Alumina in first step/total alumina (%) | Second pH | Second Temp (° C.) | |
| A | 8.9 | 30 | 35 | 8.7 | 60 | 6.0 |
| B | 9.1 | 30 | 30 | 8.7 | 60 | 6.2 |
| C | 9.1 | 31 | 31 | 8.7 | 60 | 6.3 |
| D | 8.8 | 30 | 30 | 8.7 | 60 | 6.1 |
| E | 9.3 | 27 | 30 | 8.7 | 57 | 6.1 |

Example 2

This Example 2 describes the general laboratory procedure for the preparation of the catalyst substrates (i.e., alumina-containing extrudates) that were used in the preparation of the hydroconversion catalysts of the invention. Also presented are the specific preparation conditions under which the extrudates A, B, C, D and E were prepared using the generally described procedure.

Each of the alumina powder materials described in Example 1 were mixed with water and a dilute nitric acid to form a suitable extrudable paste. The extrudable paste was formed into cylindrical extrudates having a nominal diameter of 0.8 mm. The extrudates were dried at a drying temperature followed by calcination at a calcination temperature. Table 2 presents the preparation conditions for each of the extrudates along with the % loss on ignition (% LOI) values. The extrudate Samples A through E respectively were derived from corresponding alumina powder Samples A through E.

TABLE 2

Conditions Used in the Preparation of Extrudate Samples A Through E
Extrudate Preparation

| Extrudate Sample | Acid Conc (wt %) | LOI (%) | Calcination Temp (° C.) |
|---|---|---|---|
| A | 0.5 | 63.3 | 654 |
| B | 1.5 | 63.5 | 593 |
| C | 0.5 | 63.8 | 649 |
| D | 0.5 | 64.2 | 760 |
| E | 0.5 | 64.0 | 565 |

Example 3

This Example 3 presents certain of the important physical properties of each of the extrudate samples of Example 2 and of a comparison catalyst that is a commercially available hydroprocessing catalyst.

TABLE 3

Physical Properties of Extrudates A Through E and Comparison
Physical Properties of Extrudates

| Extrudate Sample | Mercury Pore Volume (cc/g) | Surface Area (m²/g) | Median Pore Diameter (Å) | Pore Size Distribution Width (Å) |
|---|---|---|---|---|
| Comp. Catalyst | 0.84 | 255 | 122 | 36 |
| A | 0.78 | 227 | 119 | 18 |
| B | 0.89 | 251 | 119 | 22 |
| C | 0.85 | 224 | 127 | 26 |
| D | 0.84 | 221 | 127 | 20 |
| E | 0.81 | 235 | 108 | 20 |

Example 4

This Example 4 describes the laboratory impregnation procedure used to impregnate the extrudates of Example 3, with the catalytic components (i.e., Group VIII metal component, Group VIB metal component, and phosphorous component) and the further treatment of the impregnated catalyst substrate to provide the final hydroconversion catalyst of the invention. Each of the metal impregnations of the catalyst substrate was the same.

For 200 g of calcined alumina extrudate an impregnation solution was prepared by adding 31.76 g of molybdenum oxide (assay: 66.26% molybdenum), 12.63 g of nickel carbonate (assay: 40.24% nickel) and 6.3 g of phosphoric acid solution (assay: 16.86% phosphorus) to about 200 ml of water, heating the mixture close to its boiling point until all the solids were dissolved, and then adjusting the solution volume (by either boiling off water or adding water) to the exact pore volume of the 200 g of calcined alumina extrudate. This solution was added to the calcined alumina extrudate, and the thus-impregnated calcined alumina extrudate was aged for a minimum of 2 hours, and then dried at 1000° C. for 4 hours minimum, followed by calcination in air at 538° C. for 90 minutes. The final metal loadings of the catalysts A, B, C, D and E and the metal loadings of the comparative catalyst include 8.7 wt % molybdenum (as metal), 2.1 wt % nickel (as metal), and 0.7 wt % phosphorous (elemental).

Example 5

This Example 5 describes the experimental testing procedure and testing conditions used to test the hydrotreating and hydroconversion performance properties of a comparison catalyst of Example 3 and of the hydroconversion catalysts A through E of Example 4.

Each of the catalysts A through E and the commercially available comparison catalyst were tested for their catalytic performance in the hydroprocessing and hydroconversion of a heavy hydrocarbon feed having the composition and properties presented in Table 4 below. The tests presented in this Example 5 were conducted in a continuous stirred tank reactor (CSTR) using a laboratory autoclave equipped with a standard, commercially available Robinson-Mahoney stationary catalyst basket. The reactor was filled with 138 cc of the relevant catalyst and the reactor was charged with the heavy hydrocarbon feed at a rate of 150 g/hour and with hydrogen at a rate of 97.1 standard (temperature is 25° C., pressure is 1 atm.) liters per hour. The reaction conditions were maintained at 1500 psia and 423° C.

TABLE 4

Heavy Hydrocarbon Feed Properties and Composition

| | |
|---|---|
| Density (g/ml) | 1.0172 |
| Sulfur (wppm) | 48132 |
| Nitrogen (wppm) | 4530 |
| Carbon (wt %) | 82.98 |
| Hydrogen (wt %) | 10.36 |
| Toluene Insolubles (wt %) | 0.42 |
| MCR (wt %) | 14.12 |
| Ni (ppm) | 90.1 |
| V (ppm) | 237 |
| IBP-524, wt. % | 42.45 |
| 524+, wt. % | 56.37 |

The product was recovered and the composition thereof was determined which permitted a determination of the percent conversion of the pitch component of the feed. The results of the performance testing of catalyst A, as compared to the comparison catalyst are presented graphically, in FIG. 1, to illustrate the data generated in this study. Also presented in Table 5 below is the calculated average pitch conversion of each of the catalysts and the improvement in pitch conversion that the inventive catalysts present relative to the comparison catalyst.

TABLE 5

Pitch Conversion Provided by Catalysts

| Catalyst | Average Pitch Conversion (%) | Delta From Comparison |
|---|---|---|
| Comparison Catalyst | 59.7 | 0 |
| A | 63.2 | 3.5 |
| B | 62.7 | 3.0 |
| C | 60.7 | 1.0 |
| D | 62.2 | 2.4 |
| E | 61.8 | 2.1 |

The results from these tests show that the inventive catalysts have comparable stability to that of the comparison catalyst but they provide significantly higher pitch conversion. Further demonstrated is that certain of the inventive catalysts that have particularly narrow pore size distribution widths and specific mean pore diameters provide for even greater pitch conversion than those having wider pore size distribution widths and mean pore diameters outside a specific ranges.

Example 6

Figure 3:
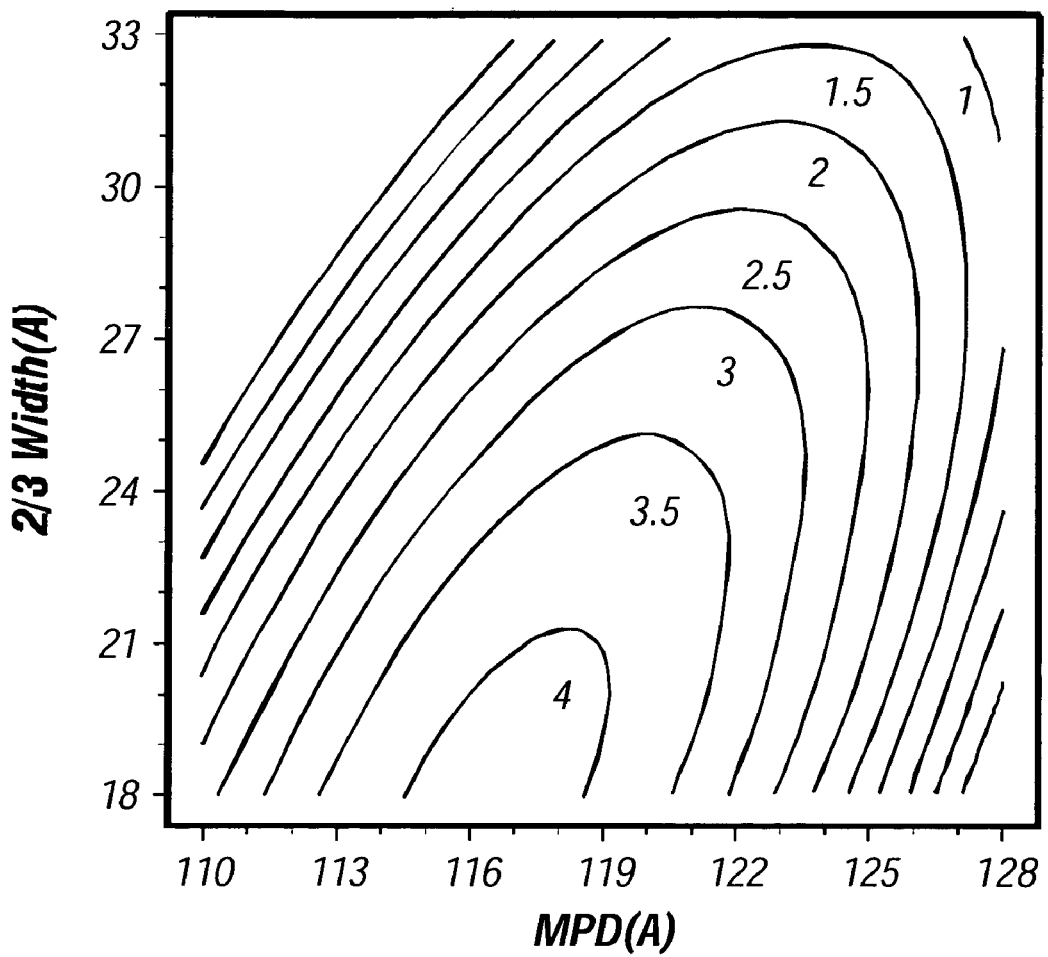
FIG. 3 presents a contour plot for a three-dimensional prediction model for predicting the percent pitch conversion advantage for the hydroconversion catalyst composition of the invention when it is used in the inventive process for the hydroconversion of a heavy hydrocarbon feedstock. The prediction model is based on the two physical property parameters of the hydroconversion catalyst support composition of pore size distribution width (Angstroms) and median pore diameter (Angstroms) that are used to predict the percentage of pitch of a heavy hydrocarbon feedstock that is converted relative to a comparative catalyst.

Certain of the unexpected features of the inventive catalysts are depicted in FIG. 3 as a prediction model, which provides for the prediction of the percent conversion advantage that the inventive catalysts provide over the comparative catalyst.

The prediction model is a proprietary model that utilizes an extensive database of information and can be used to predict the pitch conversion advantage provided by the inventive catalyst based on the two physical property parameters of pore size distribution width and median pore diameter when the inventive catalysts are used in the hydroconversion of a heavy feedstock. The model of FIG. 3 is presented to illustrate the significance of the narrow pore size distribution width and median pore diameter in providing for high pitch conversion and pitch conversion advantage. Pitch conversion advantage is defined as the difference between the percent conversion of pitch that the relevant catalyst and the comparison catalyst provide when processing the same feed under the same reaction testing conditions.

Reasonable variations, modifications and adaptations of the invention can be made within the scope of the described disclosure and the appended claims without departing from the scope of the invention.

That which is claimed is:

1. A catalyst composition suitable for use in the hydroconversion of a heavy hydrocarbon feedstock, said catalyst composition comprises:
    a Group VIB metal component;
    a Group VIII metal component; and
    a support material consisting essentially of alumina, wherein said support material has a median pore diameter in the range of from about 110 Angstroms to about 126 Angstroms, a pore size distribution width of less than about 33 Angstroms, and a pore volume of at least about 0.75 cc/gram, said catalyst composition in its fresh state having an activity for the conversion of pitch exceeding 58 weight percent.

2. A catalyst composition as recited in claim 1, wherein less than 5 percent of said pore volume of said support material is present in pores having pore diameters greater than about 210 Angstroms.

3. A catalyst composition as recited in claim 2, wherein said support material includes no more than a small concentration of silica.

4. A catalyst composition as recited in claim 3, further comprising:
    a phosphorus component.

5. A catalyst composition as recited in claim 4, wherein:
    said Group VIB metal component is present in said catalyst composition in the range of from about 4 weight percent to about 15 weight percent;
    said Group VIII metal component is present in said catalyst composition in the range of from about 0.5 weight percent to about 4 weight percent; and
    said phosphorus component is present in said catalyst composition in the range of from about 0.05 weight percent to about 3 weight percent,
    with the weight percents being that of the metal regardless of the form thereof and further being based on the total weight of said catalyst composition.

6. A catalyst composition as recited in claim 5, wherein said small concentration of silica in said support material is less than 3 weight percent of said support material.

7. A catalyst composition as recited in claim 6, wherein said alumina of said support material is made by the method comprising the steps of:
  forming a first aqueous slurry of alumina by mixing, in a controlled fashion, a first aqueous alkaline solution and a first aqueous solution of a first aluminum compound so as to thereby provide said first aqueous slurry having a first pH in the range of from about 9 to about 10 while maintaining a first aqueous slurry temperature in the range of from about 25 to 30° C.;
  thereafter, increasing said first aqueous slurry temperature to the range of from about 50° C. to 90° C. to provide a temperature adjusted first aqueous slurry;
  forming a second aqueous slurry, comprising alumina, by adding in a controlled fashion to said temperature adjusted first aqueous slurry a second aqueous solution of a second aluminum compound and a second aqueous alkaline solution so as to thereby provide said second aqueous slurry having a second pH in the range of from about 8.5 to 9 while maintaining a second aqueous slurry temperature in the range of from about 50° C. to 90° C.; and
  recovering at least a portion of said alumina of said second aqueous slurry and utilizing the thus-recovered alumina as said alumina of said support material.

8. A catalyst particle comprising said catalyst composition of claim 1, 2, 3, 4, 5, 6, or 7, wherein said catalyst particle provides for a bulk density that makes said catalyst particle effective for use in an ebullated reactor bed for the hydroconversion of said heavy hydrocarbon feedstock.

9. A catalyst composition as recited in claim 2, wherein the median pore diameter of said support material is in the range of from about 112 Angstroms to about 122 Angstroms and the pore size distribution width is less than about 25 Angstroms.

10. A catalyst composition as recited in claim 9, wherein less than 3 percent of the pore volume of said support material is present in pores having a diameter greater than about 210 Angstroms.

11. A catalyst composition as recited in claims 1 wherein said alumina of said support material comprises gamma alumina.

12. A catalyst composition as recited in claim 1, wherein said pore volume of said support material is at least the value as determined by the following equation: $PV \geqq 0.7 + 0.004 \times (w)$, wherein PV is the total pore volume and (w) is the pore size distribution width in Angstroms.

13. A catalyst composition as recited in claim 9, wherein the median pore diameter of said support material is in the range of from about 114 Angstroms to about 120 Angstroms, and the pore size distribution width is less than about 22 Angstroms.

* * * * *